Patented Mar. 20, 1923.

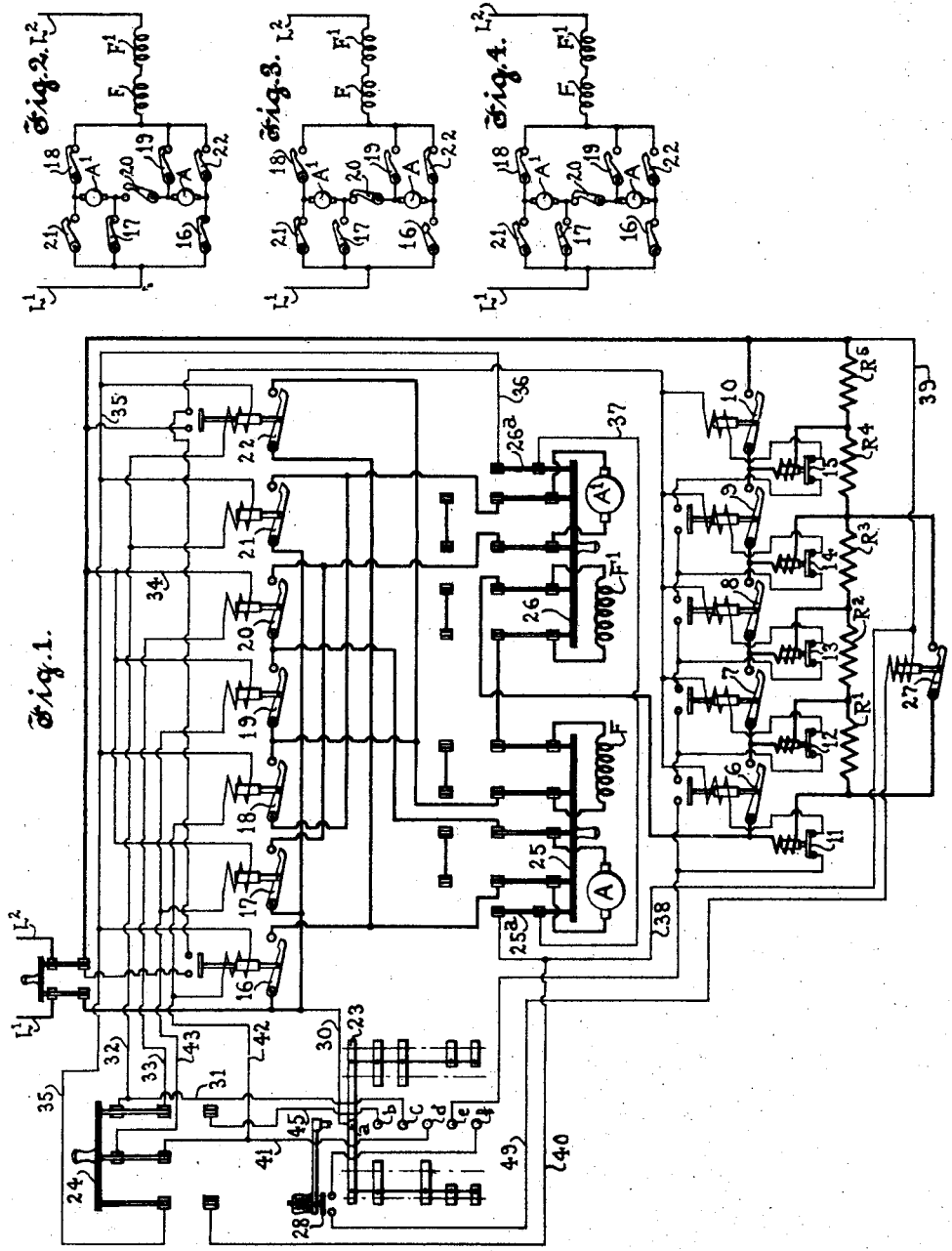

1,449,239

UNITED STATES PATENT OFFICE.

NIELS L. MORTENSEN, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR ELECTRIC MOTORS.

Application filed May 31, 1921. Serial No. 473,767.

*To all whom it may concern:*

Be it known that I, NIELS L. MORTENSEN, a citizen of the United States, residing at Milwaukee, in the county of Milwaukee and State of Wisconsin, have invented new and useful Improvements in Controllers for Electric Motors, of which the following is a full, clear, concise, and exact description, reference being had to the accompanying drawing, forming a part of this specification.

This invention relates to controllers for electric motors and more particularly to controllers adapted to effect certain series parallel commutation of the circuit connections of a plurality of associated motors.

In certain types of installation employing a plurality of motors, of which type screw down mechanisms for rolling mills may be taken as exemplary, it is exceedingly desirable to provide for frequent and fine adjustments of the driven device in one direction while providing for rapid return travel of the device.

To such end it has heretofore been proposed to provide for connecting the driving motors in series relation for joint operation of the driven device in one direction and in parallel relation for operation in the opposite direction.

The present invention has among its objects that of providing an improved method of commutating the circuit connections of a plurality of motors to render the control characteristics suitable for the aforementioned and other classes of service.

Another object is that of providing an improved and simplified controller for performance of such method.

Another object is that of reducing the number of contactors employed in commutating the circuit connections of a plurality of motors to afford the foregoing operative characteristics, while maintaining suitable speed and power correlation of the motors.

Another object is that of providing such a controller wherein provision is made for operating the motors individually and for otherwise varying at will the character of the control effected.

Another object is that of providing such a controller having interlocks functioning to vary automatically the character of control effected to thereby adapt the same to the particular conditions imposed through the voluntary control varying means.

Other objects and advantages will hereinafter appear.

In the accompanying drawing, wherein is illustrated a controller embodying the physical aspects of the invention, Fig. 1 is a diagrammatic view thereof; while, Figs. 2, 3 and 4 are simplified diagrams illustrating the relations of the principal control elements corresponding with the several steps of control.

According to the instant method, it is proposed to effect series parallel commutation of the armatures of the respective motors to be controlled, the motor series fields being maintained in series relation to one another, such series parallel commutation to be effected either with or without reversal of the direction of current through the individual armatures with reference to their respective fields.

Thus assuming employment of the motors for operation of the screw down mechanism of a rolling mill or an analogous instrumentality, during down movement of the driven mechanism the motor armatures are preferably connected in series thus affording a relatively low operative speed and hence facilitating close adjustment while affording adequate torque for frequent starts. During upward movement of the driven device, which movement should be effected in the minimum time feasible and wherein intermediate stopping and close adjusting are not required, the motor armatures are connected in parallel thus affording a relatively high operative speed together with a torque sufficient for the purposes contemplated, it being recognized that in the devices mentioned the load during starting in the upward direction is due chiefly to inertia and therefore when the device is once started the field currents will be relatively low even with the fields connected in series with one another and the armatures in parallel as described.

Referring to the drawing the same illustrates a pair of reversible motors comprising armatures A and A' having respectively associated series fields F and F'. Said motors are adapted to be supplied with current from lines L' and L² and to be subjected to joint acceleration control by means of steps R' to R⁵ of starting resistance to be progressively excluded from the joint circuit of the motors by means of electro-responsive switches 6 to 10, subject to delay by individual series relays 11 to 15.

A series of electro-responsive switches 16 to 22 serve to control line connection of said motors and also to effect reversal and series parallel commutation thereof, said switches being in turn controllable by a drum controller 23 in conjunction with a changeover switch 24. Knife switches 25 and 26 are associated with the respective motors to provide for selective short-circuiting of the latter.

In addition to the foregoing features an electro-responsive switch 27 provides for exclusion of a relatively large step of the starting resistance to provide for an increase in the torque of the motors to free the driven mechanism in case of sticking, whereas interlocks to be hereinafter described are provided for preventing establishment of parallel connections during short-circuiting of either motor and also to afford other safeguards.

The various controller parts being in the relations illustrated in Fig. 1 the operation of the controller may be described as follows, reference being had also to Figs. 2, 3 and 4 as illustrating the power connections of the motors corresponding with different positions of the drum controller.

Movement of the drum controller to the right from the off position illustrated serves to effect closure of switches 16, 17, 18 and 19, thus connecting the motor armatures in parallel with one another and jointly in series with their series fields as illustrated in Fig. 2.

Movement of the drum controller to the left through the off position serves to permit openings of said switches 16, 17, 18 and 19 and continued movement to the left serves to effect closure of switches 20, 21 and 22 for connecting the motor armatures in series with one another, the direction of current therethrough being reversed with reference to the current in their respective associated fields as illustrated in Fig. 3.

Movement of the changeover switch 24 to its lower on position serves to restrict the control effected by the drum controller to the establishment of series connection of the motors for joint operation in reverse directions selectively. Thus with said changeover switch in its down position, movement of the drum controlled from off position to the right serves to effect closure of switches 16, 18 and 20 as illustrated in Fig. 4, thus establishing series circuit connection of the motor armatures such as to effect rotation thereof in the same direction as in Fig. 2, while movement of the drum controller from off position to the left under the last assumed positioning of the changeover switch serves to provide again the same circuit connections illustrated in Fig. 3. It is thus apparent that the control effected by movement of the drum controller to the left is not influenced by changing the positioning of the changeover switch.

It is also apparent that paralleling of the motor armatures by means of the drum controller is permitted with the changeover switch in its upper position but is prevented during down positioning of said changeover switch.

Movement of the drum controller to either of its extreme positions serves to initiate progressive closing action of the accelerating switches for exclusion of the series resistance subject to delay by the action of the individual series relays in a well known manner. Also in either extreme position of the drum controller the relay 27 may be energized by actuation of a suitable manual switch 28 which may be associated with the drum controller handle as shown.

The operation of the changeover switch 24 may be described more specifically as follows. Positioning of said switch in its upper on position as illustrated serves to subject the energizing coils of switches 16, 18, 21 and 22 to joint control by means of interlocks on the two knife switches 25 and 26, the function of the interlocks being to prevent establishment of parallel circuit connections in the event of short-circuiting of either motor by means of its associated knife switch. Down positioning of the changeover switch serves to relieve the aforementioned electro-responsive switches of control by said interlocks since, as aforestated, in the down position of the changeover switch the circuit connections afforded by the drum controller do not provide for paralleling of the armatures and consequently the action of the interlocks is not required.

Up positioning of the changeover switch also provides for energization of the closing coils of switches 17 and 19 by the drum controller, said switches, however, being incapable of energization through the drum controller in the down position of said changeover switch. Up positioning of the changeover switch further provides for energization of the switch 20 but only upon movement of the drum controller to the left, whereas upon down positioning of the changeover switch, said switch 20 is adapted to be energized upon movement of the drum controller in either direction from the off position illustrated.

The various accelerating switches are furthermore electrically interlocked with the switches 16 and 22, as illustrated, to permit energization of the accelerating switches by means of the drum controller only following previous closure of one or the other of said switches 16 and 22. This arrangement obviously serves to prevent such exclusion of the accelerating resistance prior to completion of the motor circuit.

The control circuits for switches 16 to 22 may be described as follows. In the up positioning of changeover switch 24 movement of the drum controller to the left serves to complete the energizing circuits of switches 20, 21 and 22 such circuit extending from line L' by conductor 30 through contacts $a$ and $c$ of the drum controller, thence by conductors 31 and 32 through the energizing winding of switches 21 and 22, also by conductor 31 through the right hand contacts of the changeover switch and by conductor 33 through the winding of switch 20, the return circuit connection of switch 20 being by conductor 34 directly to line $L^2$. The return circuit connection for switches 21 and 22 on the other hand extends by conductors 35 and 36 through auxiliary contacts $26^a$ of the knife switch 26, thence by conductor 37 through auxiliary contacts $25^a$ of knife switch 25 by conductors 38 and 39 to line $L^2$.

Obviously for down positions of the changeover switch the return circuit of said switches 21 and 22 extends by way of conductor 35 to the left through the left contacts of said changeover switch by conductor 40 to conductor 38, shunting the interlock contacts $25^a$ and $26^a$, and thence to line $L^2$ as formerly traced.

Movement of the drum controller to the right during up positioning of the changeover switch serves to complete the energizing circuits of switches 16, 17, 18 and 19 by means of contacts $a$ and $d$ of the drum controller thence by conductors 41 and 42 through the windings of the switches 16 and 18, also by conductor 41 through the middle contacts of the changeover switch and by conductor 43 through the windings of switches 17 and 19, the return circuit connection for switches 16 and 18 being identical with that of switches 21 and 22 aforedescribed, and the return circuit connection for switches 17 and 19 being made directly to line $L^2$ by way of conductor 34 as in the case of switch 20 aforedescribed.

The energizing circuit for switch 20, completed by movement of the drum controller to the left in the down position of the changeover switch is through contact $b$ of the drum controller, by conductor 45 to the lower right hand contact of the changeover switch, thence through said switch and by conductor 33 as formerly traced.

The control circuits for the accelerating switches being merely those ordinarily employed for like purposes and being not specifically important herein will not be traced in detail. The circuit of switch 27 obviously may be established by the manual switch 28 only following placing the drum controller in extreme position such as to effect energization of its contact $f$, such circuit extending from said contact to and through the switch 28 thence by conductor 49 through the winding of switch 27 and by conductor 39 to line $L^2$.

It is of course to be understood that other interlocks and safety devices may be employed if desired, the special features aforediscussed being incorporated herein merely for the purpose of showing that the present method is workable in conjunction with the additional features ordinarily employed in like controllers and that moreover the special arrangement of the reversing and series paralleling switches herein contemplated is likewise adaptable in any of the ordinary installations without in any wise increasing the complication thereof or reducing the number of necessary or desirable control features provided.

It is further to be noted that according to the instant method all the control features which are necessary or ordinarily desirable in the control of a screw down or similar mechanism are provided by the use of only three switches in addition to the number of reversing and accelerating switches which would be required for adequate control of a single motor under like operative conditions.

What I claim as new and desire to secure by Letters Patent is:

1. The method of controlling a plurality of motors which comprises series parallel commutation and concurrent reversal of certain of the elements of the individual motors while maintaining a given relation of other of the elements of the motors.

2. The method of controlling a plurality of motors which comprises series parallel commutation of certain of the elements of the individual motors and concurrent reversal of the motors while maintaining a given relation of other of the elements of the individual motors.

3. The method of controlling a plurality of motors which comprises reversal of such motors and concurrent series parallel commutation of the armatures thereof while maintaining the motor fields in a given relation to one another.

4. The method of controlling a plurality of motors which comprises reversal of the motors and concurrent series parallel commutation of the armatures thereof while maintaining the motor fields in series relation to one another.

5. The method of controlling a plurality of motors which comprises effecting line connection of the motors with their armatures in parallel relation to one another and their fields in series to one another and thereafter commutating the connections to effect series relation of the motor armatures while maintaining series relation of the motor fields.

6. The method of controlling a plurality of motors which comprises effecting series line connection of the motors and thereafter commutating the connections to reverse the direction of rotation of the motors and to connect the motor armatures in parallel relation with one another while maintaining the fields in series relation.

7. A controller for a plurality of motors comprising means to connect said motors in series relation and to effect line connection thereof and other means for connecting the motor armatures in parallel relation and each in circuit with its associated field but in a relation of reverse polarity thereto while maintaining series connection of the motor fields.

8. In a controller for a plurality of motors, the combination with three switches adapted to effect line connection of the motors in series relation to one another, of four switches adapted to effect line connection of said motors with their armatures in parallel relation to one another and each in series with its associated field.

9. In a controller for a plurality of motors, in combination, a switch for connecting the motor armatures in series relation, a pair of switches adapted to effect line connection of the motors jointly while their armatures are so connected, a second pair of switches adapted similarly to effect line connection of the connected motors but in a relation providing for reverse operation thereof, and a third pair of switches adapted to co-operate with certain of said former switches to effect line energization of the motors with their armatures in parallel relation and each in series with its associated field.

10. In a controller for a plurality of motors, in combination, a switch for connecting the motor armatures in series relation, a pair of switches adapted to effect line connection of the motors jointly while their armatures are so connected, a second pair of switches adapted similarly to effect line connection of the connected motors but in a relation providing for reverse operation thereof and a third pair of switches adapted to co-operate with certain of said former switches to effect line connection of the motors with their armatures in parallel relation and each in series with its associated field, means for short-circuiting said motors selectively and control means for said switches including interlocks providing against establishment of parallel circuit connections during short-circuiting of either motor.

11. In a controller for a plurality of motors, a switch for connecting the motor armatures in series relation, pairs of reversing switches to operate selectively for effecting line connection of the motors jointly while their armatures are so connected and to reverse the polarity of each motor armature with reference to its field, and two switches to act in conjunction with certain of said pairs of switches for effecting parallel line connections for the motors.

12. A reversing controller for a plurality of motors adapted to effect series parallel circuit commutation thereof while maintaining each armature in series with its associated field, comprising a number of sets or reversing and series paralleling co-operating contacts less than twice the number required to provide for reversible circuit connection of a single motor.

13. A reversing controller for a plurality of motors or groups of motors adapted to provide series paralleling and reversing circuit commutation thereof while maintaining each armature in series with its associated field, comprising a number of sets of co-operating contacts not exceeding three times the number of such motors or groups of motors by more than one.

14. A controller for effecting reversal of two motors or two groups of motors and series paralleling commutation of the circuits thereof while maintaining each motor armature in series with its associated field, comprising four sets of reversing switch contacts and three series paralleling switches.

In witness whereof, I have hereunto subscribed my name.

NIELS L. MORTENSEN.